April 15, 1952 M. H. JENNINGS 2,592,572

APPARATUS FOR RECORDING AND REPRODUCING ELECTRICAL COMMUNICATION CURRENTS

Filed Aug. 16, 1946 5 Sheets-Sheet 1

MALBON H. JENNINGS
INVENTOR

BY Moore, Nolte, Crews & Berry
ATTORNEY

MALBON H. JENNINGS
INVENTOR

BY
Moses, Nolte, Crews & Berry
ATTORNEY

April 15, 1952 M. H. JENNINGS 2,592,572

APPARATUS FOR RECORDING AND REPRODUCING ELECTRICAL COMMUNICATION CURRENTS

Filed Aug. 16, 1946 5 Sheets-Sheet 3

MALBON H. JENNINGS
INVENTOR

BY *Moses, Nolte, Crews & Berry*
ATTORNEY

April 15, 1952 M. H. JENNINGS 2,592,572

APPARATUS FOR RECORDING AND REPRODUCING ELECTRICAL COMMUNICATION CURRENTS

Filed Aug. 16, 1946 5 Sheets-Sheet 4

MALBON H. JENNINGS
INVENTOR

BY *Mosse, Nolte, Crews & Berry*
ATTORNEY

MALBON H. JENNINGS
INVENTOR

BY
Moore, Nolte, Crews & Berry
ATTORNEY

Patented Apr. 15, 1952

2,592,572

UNITED STATES PATENT OFFICE 2,592,572

APPARATUS FOR RECORDING AND REPRODUCING ELECTRICAL COMMUNICATION CURRENTS

Malbon H. Jennings, Yonkers, N. Y.

Application August 16, 1946, Serial No. 690,985

6 Claims. (Cl. 179—100.3)

My invention relates to recording and reproduction of sound using a moving photographic film, and more particularly to means for eliminating the audible effects of variations in density of emulsion, imperfections in the film, whether opaque or transparent, and variations of a similar nature which occur in the photographic medium, all of which combine to introduce both noise and distortion in the reproduced signal. In addition, my invention substantially completely eliminates noise or distortion which may be introduced by electro-mechanical recording devices, and substantially reduces any noise produced by the vacuum tubes themselves such as shot effect or thermal agitation.

An object of my invention is to provide a system for the photographic recording and reproducing of sound in which the audio frequencies are converted into phase or frequency modulated carrier currents, which in turn are converted into a series of uniform transverse lines of variable spacing when photographed on a moving film. In reproducing the recorded sound, the transverse lines are converted into substantially uniform electrical pulses of variable spacing and these pulses are in turn converted into a phase or frequency modulated current, from which any amplitude variations are removed by means of a limiter. The resulting currents are then detected by a frequency responsive detector and reproduced.

A further object of my invention is to provide a system for recording sound on a moving photographic film and for reproducing the recorded sound in which the optical effects of photographic variations in the film which will be rendered essentially inaudible at the acoustical output of the reproducer.

A similar object is to provide a system for recording sound on a moving photographic film and for reproducing the recorded sound in which the noise and distortion introduced by electromechanical devices is substantially completely eliminated and the shot effect and thermal noise introduced by the vacuum tube electron current flow is substantially reduced.

Another object is to provide a recording system in which the higher frequencies are preemphasized, to obtain additional improvement in signal to noise ratio, to be used in conjunction with the above described recording system.

A similar object is to provide a receiving system including corresponding deemphasis in order to further reduce noise effects inherent in the film, to be used in conjunction with the above described reproducing system.

A further object is the provision of a method for the recording of sound on a moving medium of any type in which the sound is first translated into a series of uniform markings or impressions whose spacing along the moving medium varies in accordance with the characteristics of the recorded sound.

Another object is to provide a method for reproducing sound previously recorded in the form of uniform markings or impressions whose spacing along the moving medium varies in accordance with the characteristics of the sound by translating the markings into a series of corresponding electrical impulses and converting these impulses into a frequency modulated carrier current by means of frequency multipliers. The frequency modulated currents thus produced are then detected by a frequency responsive detector and amplified.

Referring to the drawings.

Figures 1, 3:
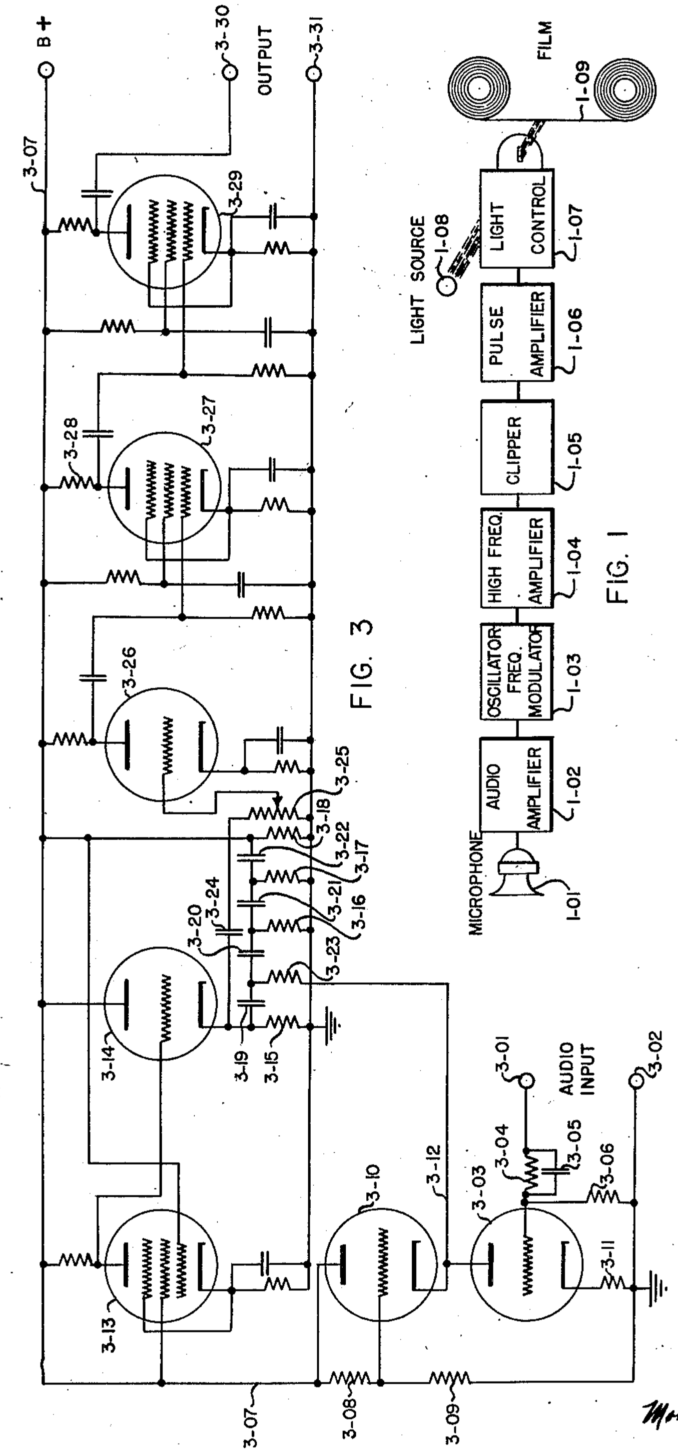
Figure 1 is a simplified diagrammatic representation of an embodiment of the invention in which the sound is recorded on photographic film.
Figure 3 shows a circuit diagram of a portion of the recording apparatus.

Referring to Figure 1, sound picked up by microphone 1—01 is amplified by amplifier 1—02 and impressed on frequency-modulator 1—03. The modulated currents are amplified in high frequency amplifier 1—04 producing an output having the general wave shape illustrated in Figure 8. The output of amplifier 1—04 passes through a clipper stage 1—05 which produces an output of the shape indicated in Figure 9. This series of pulses is amplified in pulse amplifier 1—06 which has an output of the characteristics shown in Figure 10. These pulses are applied to the light control unit 1—07 which allows light from source 1—08 to fall on the moving film 1—09 in a manner to produce a photographic record thereon as shown in Figure 11.

Figure 2:
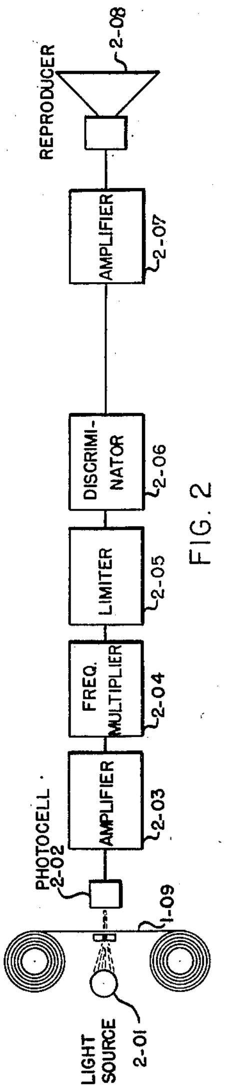
Figure 2 is a simplified diagrammatic representation showing arrangements for reproducing sound recorded using the arrangement of Figure 1.

Figure 2 shows the manner of reproducing the sound after film 1—09 has been subjected to the usual photographic processes. Light from source 2—01 passes through moving film 1—09 and is converted into a series of pulses which fall on photocell 2—02. The resulting electrical pulses are amplified in amplifier 2—03 and subjected to a series of frequency multiplications in frequency multiplier 2—04. The tuned circuits of multiplier 2—04 are so damped that the steep wavefront effects produced by the pulses of light falling on the photocell 2—02 create a frequency modulated current whose waveshape is similar to that in Fig. 8, but several times higher in frequency and deviation than the original phase or frequency modulated wave. Amplitude variations are removed by limiter 2—05, and the amplitude-limited frequency-modulated currents are converted into amplitude modulated currents by discriminator 2—06, which in turn are amplified in amplifier 2—07 and reproduced by reproducer 2—08.

The recording apparatus is shown in greater detail in Fig. 3. The audio frequency voltage to be recorded is applied to terminals 3—01 and 3—02. This voltage is derived from a microphone or other source of audio frequency voltage representing the sound to be recorded. This voltage is applied to the control grid of triode 3—03 and controls the flow of anode current therein in conventional manner.

The resistance capacitance network consisting of capacitor 3—05 shunting resistor 3—04 serves to pre-emphasize the higher frequencies which are to be recorded, and to cause the higher frequencies to produce a greater control effect on the grid of triode 3—03 than the lower frequencies.

Anode supply current from conductor 3—07 is applied to the series combination of resistors 3—08 and 3—09 which are preferably of approximately equal values of resistance. The grid of triode 3—10 is thus maintained at a fixed potential of approximately one-half of the anode supply potential. Bias for the grid of triode 3—03 is provided by cathode biasing resistor 3—11. Because of the substantially fixed biasing arrangements, there is no effective cross-interaction between the triodes and the effective internal alternating current resistances increase and decrease together under control of the grid of triode 3—03. The result is that a varying A. C. resistance to ground appears at conductor 3—12, and that this resistance is symmetrical for both halves of the wave.

The pentode 3—13 and the triode 3—14 in combination with the network comprising resistors 3—15, 3—16, 3—17, 3—18 and 3—23 and capacitors 3—19, 3—20, 3—21 and 3—22 constitute an oscillator. The frequency of oscillation may be controlled by varying the resistance to ground in the circuit of 3—23. Because resistor 3—23 is returned to ground through the varying internal impedances of triodes 3—10 and 3—03, the frequency of oscillation will change in accordance with the audio frequency input to terminals 3—01 and 3—02, producing a frequency modulated signal.

This frequency modulated current passes through capacitor 3—24 to potentiometer 3—25 from which a portion is applied to the grid of triode 3—26 which is connected as an amplifier.

Figure 8:
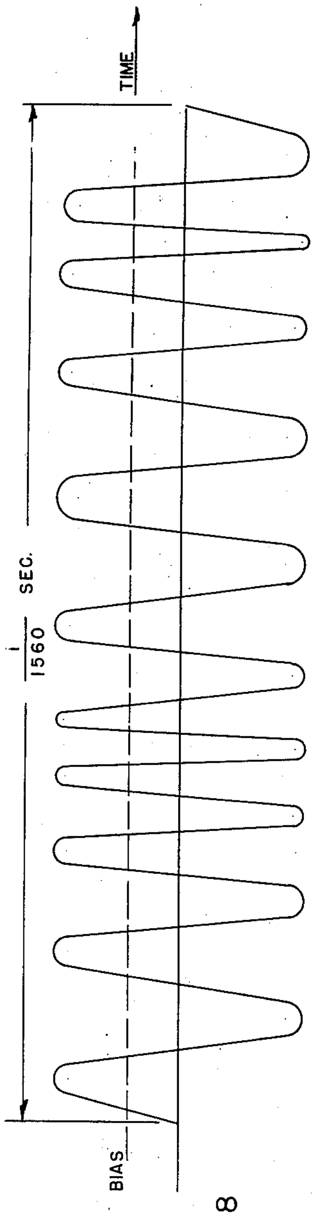
Figures 8, 9 and 10 show wave shapes produced in various portions of Figure 1.
Figure 9:
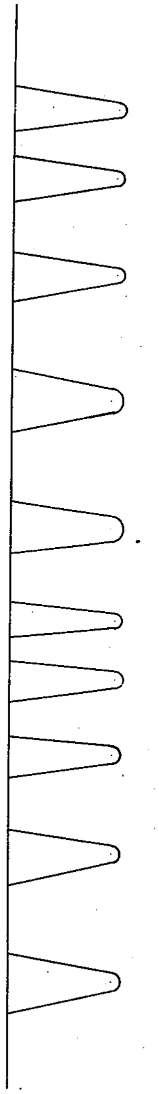

The output of triode 3—26 is coupled to the control grid of pentode 3—27 which is so biased, as indicated by the dotted horizontal line of Fig. 8, that peaks of the signal voltage are clipped thus producing a voltage drop across resistor 3—28 represented by the curve of Fig. 9.

Figure 10:
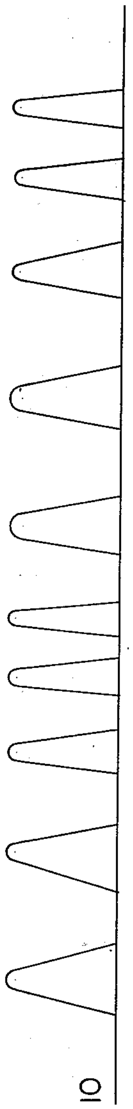
Figure 11:
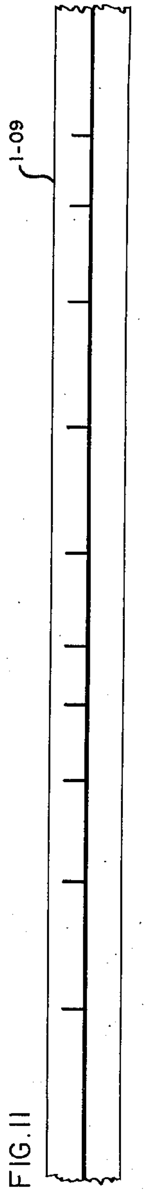
Figure 11 shows the form of record produced on the film by the wave shapes in Figures 8, 9 and 10.

These pulses are amplified by pentode 3—29 which produces an output, reversed in phase, as indicated by Fig. 10 which consists of a series of substantially uniform pulses of variable spacing which are available at terminals 3—30 and 3—31. The corresponding record produced on the moving film 1—09 is shown in Fig. 11.

It is to be understood that any desired form of phase or frequency modulator may be substituted for that shown in Fig. 3, and also any convenient method of producing a series of pulses from the frequency modulated current may be used instead of the specific arrangement illustrated. It is to be further understood, that since phase modulation involves changes in frequency, and vice versa, the expressions "phase modulation" and "frequency modulation" are used interchangeably herein.

Figure 4:
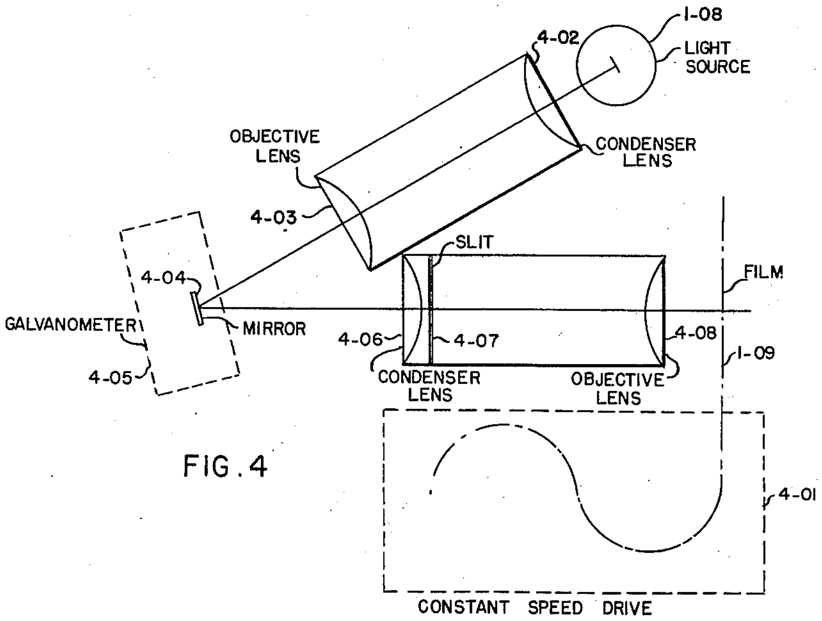
Figure 4 is a diagrammatic representation of an optical system for use in recording.
Figures 5, 6:
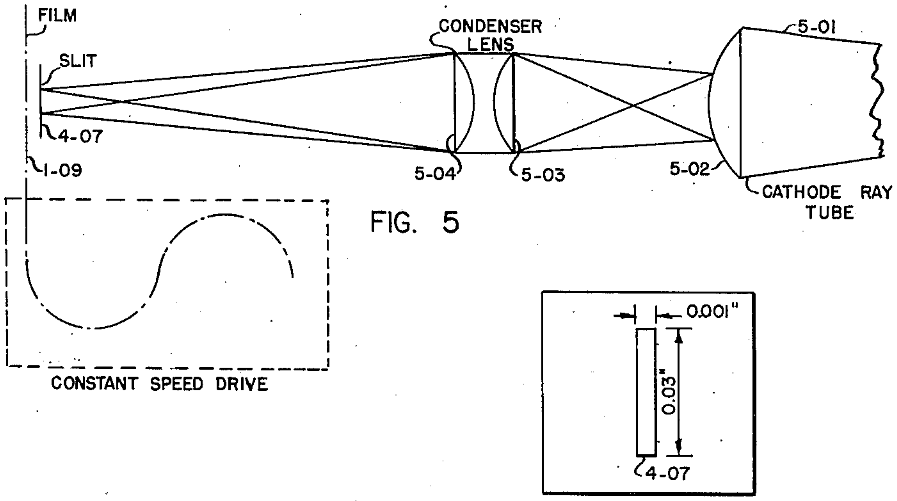
Figure 5 is a diagrammatic representation of another form of optical system for recording.
Figure 6 is a detail of an optical slit used in recording.
Figure 7:
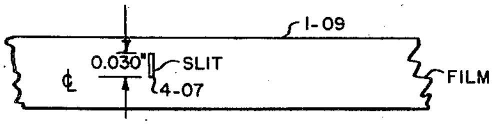
Figure 7 is a detail illustrating the location of the slit of Figure 6 with relation to the film during recording.

Referring to Fig. 4, film 1—09 moves at substantially constant speed under the influence of constant speed drive 4—01. Light from light source 1—08 passes through lenses 4—02 and 4—03 and is reflected from mirror 4—04 of galvanometer 4—05 through lens 4—06, slit 4—07, and lens 4—08 to film 1—09. The slit may be of dimensions as shown in Fig. 6 and may be positioned with respect to the sound track portion of the film as illustrated in Fig. 7, which will produce a trace as indicated in Fig. 11. Any other suitable arrangement may be substituted, provided energization of galvanometer 4—05 and the resulting deflection of mirror 4—04 will produce a series of uniform indications on the moving film as illustrated in Fig. 11 in response to a series of spaced pulses of the general character illustrated in Fig. 10. Whether or not the solid base line is present is immaterial, and is a matter of convenience, the effect of the base line, if present, being eliminated in reproducing as shown later.

Figures 12, 13, 17:
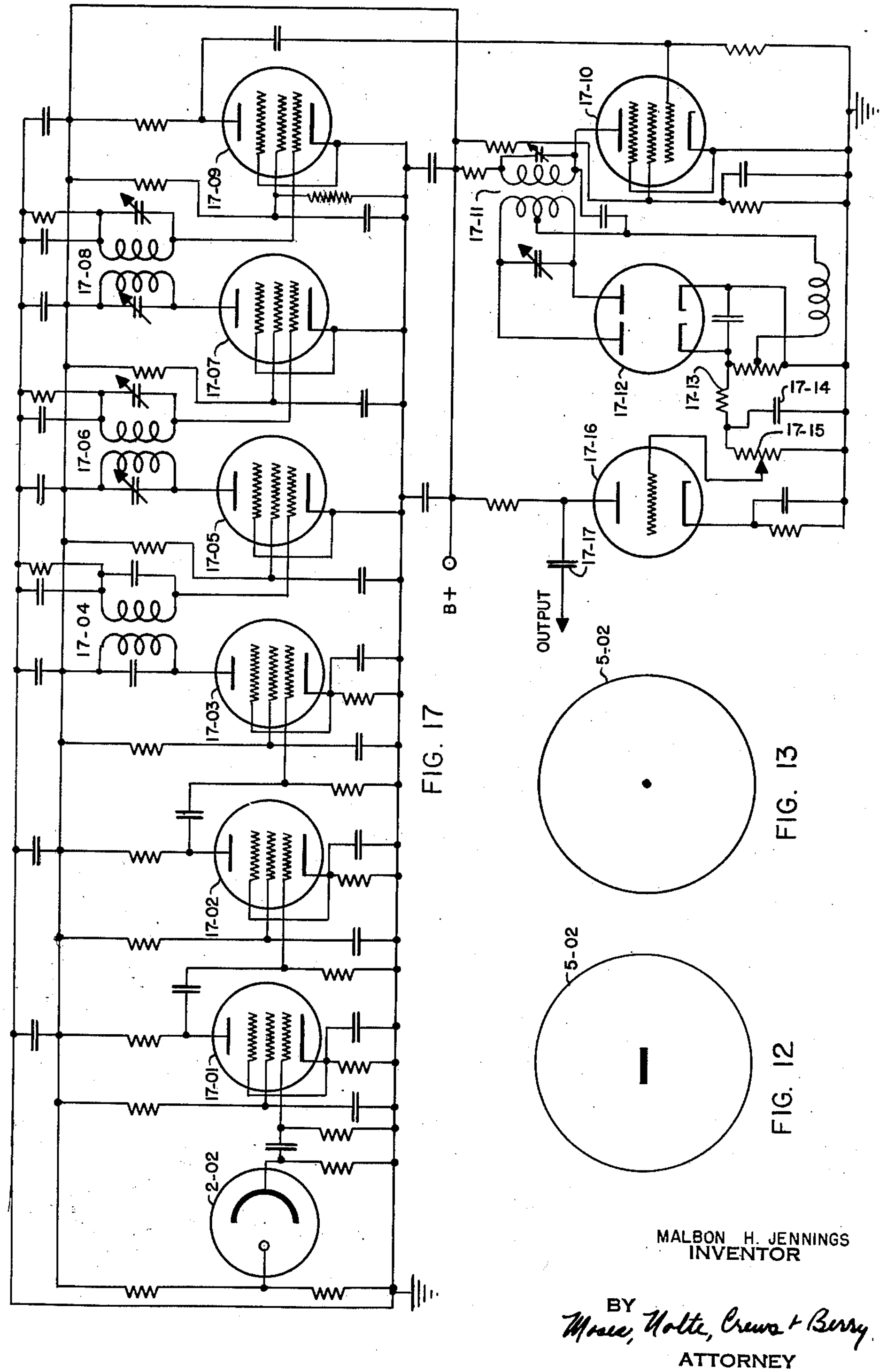
Figures 12 and 13 are end views of the cathode ray tube of Figure 5 showing the image on the screen under different conditions.
Figure 17 is a circuit diagram of amplifying and converting arrangements used in reproducing.

Another method of recording is shown in Fig. 5, in which a cathode ray tube 5—01 is utilized. The image appearing on screen 5—02 is focussed on moving film 1—09 by lenses 5—03 and 5—04. The image is limited by passing through slit 4—07 as in the case of Fig. 4. The pulses from the output terminals 3—30 and 3—31 are applied to a single pair of deflecting plates to cause the beam of the tube to move in a direction transverse to the direction of motion of the film. The image appearing on screen 5—02 when the beam is at rest is shown in Fig. 13 and the path of the beam produces a trace on the screen as shown in Fig. 12 when deflected by the frequency or phase modulated pulses. By the use of slit 4—07, the deflection may be limited as it is recorded on the moving film.

Figures 14, 15:
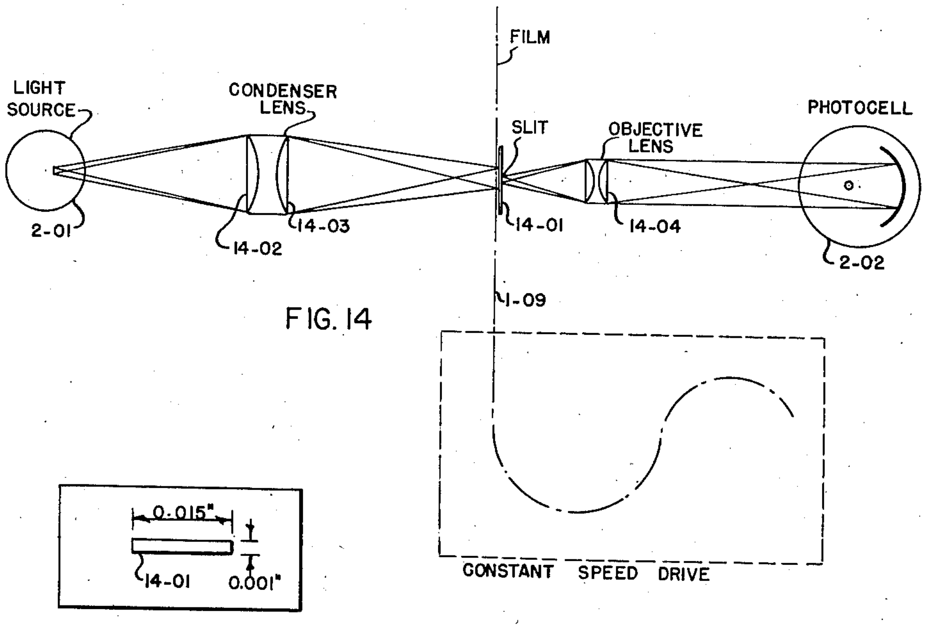
Figure 14 is a diagrammatic representation of an optical system for reproducing.
Figure 15 is a detail of an optical slit used in reproducing.
Figure 16:
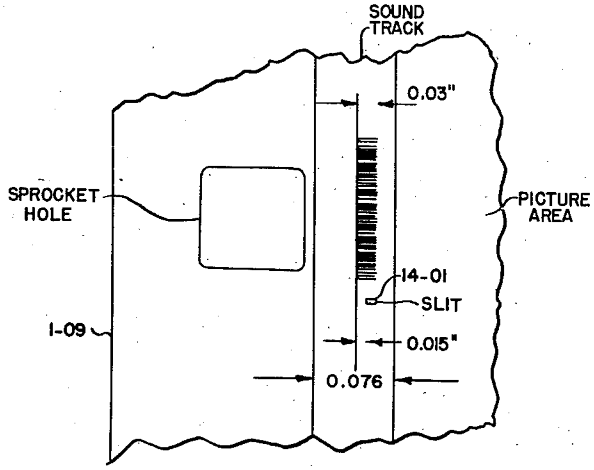
Figure 16 is a detail showing the relative position of the slit of Fig. 15 with respect to the sound track of a film.

An optical arrangement for reproducing the recorded sound is illustrated in Fig. 14. The film with the sound recorded thereon will have, in the case of the usual commercial motion picture film, the general appearance and dimensions indicated in Fig. 16.

In order to remove the effect of a solid base line, if such a line is present, a small slit 14—01 is used. Light from a source 2—01 is focussed by lenses 14—02 and 14—03 on moving film 1—09. That portion of the transmitted light which passes through slit 14—01 is again focussed by lens 14—04 on the light-sensitive portion of photocell 2—02. The action of slit 14—01 produces pulses of light with variable spacing which spacing corresponds to the original spacing of the frequency or phase modulated pulses of Fig. 10.

Referring to Figure 17, the changes in resistance of photocell 2—02 are converted into electrical impulses and amplified by pentode 17—01 and again amplified by pentode 17—02. These tubes successively amplify the pulses and at the same time modify their shapes. The polarity of the pulses is so chosen that each pulse tends to cause a sharp increase in the plate current of pentode 17—03.

These pulses cause oscillations to occur in the tuned transformer circuit 17—04, and these oscillations die out at a rate determined by the losses in the tuned transformer. By suitable selection of transformer constants, this rate of decay of the oscillations may be controlled as desired. The tuning of the transformer 17—04 is such that its frequency of oscillation is a multiple of the mean frequency of the phase or frequency modulated current which produced the original pulses at the time of recording.

The output of tuned transformer 17—04 is coupled to the grid of pentode 17—05, in which an action similar to that in the preceding stage takes place. The anode circuit of pentode 17—05 energizes the tuned transformer 17—06. The damping or rate of decay of oscillations in transformer 17—06 is again so selected that the sharpness of wave shape created by the pulses of light falling on photocell 2—02 are further smoothed out. Again, the tuning of transformer 17—06 is such that its natural frequency is a multiple of the frequency to which the preceding transformer 17—04 is tuned. The output of transformer 17—06 is applied to the control grid of pentode 17—07, and the anode circuit of tube 17—07 energizes another tuned transformer 17—08. Transformer 17—08 serves to provide interstage coupling and again its damping is such as to provide further smoothing out of the frequency modulated current. The output of tuned transformer 17—08 is applied to the control grid of pentode 17—09. This pentode and pentode 17—10 are connected as conventional resistance-coupled cascade amplitude limiters whose output varies only in frequency if the current in the grid circuit is within the correct operating range and the output is, therefore, relatively unaffected by any changes in amplitude which may appear at the control grid of pentode 17—09. The action of pentodes 17—09 and 17—10 thus eliminates from the frequency modulated current appearing at the input any variations in amplitude such as those occasioned by changes in film density, imperfections in the film, and other factors which tend to cause nonuniform variations in the amount of light reaching photocell 2—02 with each pulse, in addition to which any vacuum tube noise which may have been introduced by the recording system or the earlier stages of the reproducing system is substantially reduced.

The tuned transformer 17—11 and double diode 17—12 constitute a discriminator-detector circuit of the conventional Foster-Seeley type, which transforms the frequency modulated currents into audio frequency currents. Detectors of this type are well known to the frequency-modulation art, and any suitable detector may be utilized. Amplitude modulated currents produced by the discriminator-detector are passed through a restoring network consisting of resistor 17—13 and capacitor 17—14. The frequency response characteristics of the network 17—13, 17—14 are such as to compensate for the frequency characteristics of the network 3—04, 3—05, shown in Fig. 3, and to restore to their respective original proportions the magnitudes of the various frequencies which are being recorded and reproduced, thus further reducing any noise which may have been introduced after the preemphasis was applied. The equalized audio frequency currents are taken in adjustable amount through potentiometer 17—15 and amplified by triode 17—16, the reproduced audio voltages being available at blocking capacitor 17—17 for further amplification and application to loud speaker systems.

In operation, a frequency of 15,600 cycles may be taken as an example because such a frequency will yield a convenient spacing between the respective impulses appearing on the film when the film is moving at the customary standard speeds for the projection of motion pictures. The maximum amount of frequency variation produced will naturally be selected so that the maximum variation in spacing between successive pulses appearing at the output of Fig. 3 will be suitable to maintain the desired relationships for reproduction. This maximum amount of deviation from the unmodulated pulse position is preferably such that it will not exceed one-half the distance between adjacent pulses measured along the film. Figs. 8 to 11, inclusive, show suitable spacing between the impulses which are recorded during a period $1/1560$ of a second with a mean frequency of 15,600 cycles per second and a film speed 18 inches per second. The length of film which will be occupied by these impulses is approximately 0.015″.

In reproduction, the first frequency multiplication which takes place in the output of tube 17—03, and is caused by the natural period of tuned transformer 17—04, can conveniently be made a multiplication of 4 which will increase the frequency at the input of tube 17—05 in the next stage to a value of 62,400 cycles per second. The envelope of this oscillation will be of sawtooth character, a sharp rise appearing at the time the grid of tube 17—03 is driven in a positive direction in response to each pulse received from the film. Using the frequency values selected for the purpose of this example, this sharp rise will occur approximately every fourth cycle of the 62,400 cycle frequency. Because these pulses vary in phase, this current becomes frequency modulated in accordance with the input pulses. Each pulse produced by the film starts a new train of damped oscillations at a slightly different initial point, this initial point varying in phase relationship in accordance with the spacing of the pulses along the film, thus retarding or advancing the phase relationship of the current thus producing a frequency modulated current in accordance with the original phase or frequency modulated wave produced in Fig. 3. The next frequency multiplication which takes place in the output of tube 17—05 may, for example, conveniently double the preceding frequency yielding a value fo 124,800 cycles, which will double both the mean frequency of the frequency modulated current and correspondingly will likewise double the magnitude of the frequency deviation present therein. Thus by virtue of the damping characteristics of tuned transformer 17—06 the doubling action further reduces the sawtooth characteristic caused by the input pulses, and smooths out the resulting wave shape to a still closer approximation to a true multiple of the original phase or frequency modulated current which produced the recorded pulses.

The specific values given are only illustrative and serve to indicate the relative arrangements of the recorded pulses from which the desired operation can be expected. It is also to be understood that numerous type of medium other than film may be used, such as magnetized wire or tape, markings on an opaque medium, or mechanical deformation of a recording medium. Regardless of the type of medium used, the recording apparatus will attempt to make uniform markings or impressions along the direction of medium motion, but because of variations in the properties of the medium or other causes, these markings or impressions will vary in uniformity. When the reproducing apparatus has converted the impressions on the medium back into the form of a frequency modulated current, the non-uniformities which are present because of variations of the recording medium, vacuum tube noise and similar factors will appear as amplitude variations, and these amplitude variations will be removed by the limiter before detection by a frequency responsive detector, thus rendering the effect of such variations inaudible or greatly reduced in noticeable effect at the output of the reproducing apparatus.

I have described what I believe to be the best embodiments of my invention. I do not wish, however, to be confined to the embodiments shown, but what I desire to cover by Letters Patent is set forth in the appended claims.

I claim:

1. In a device for recording electrical signals on a moving retentive medium; modulating means for converting the signals to be recorded into a frequency modulated carrier current of substantially constant mean frequency and having voltage peaks of substantially uniform amplitude, the time interval between successive voltage peaks varying in accordance with both the frequency and amplitude of the signal to be recorded; pulse producing means including wave shape modifying means for deriving a series of impulses from the successive voltage peaks of the modulated carrier current, the impulses being caused to be of substantially uniform duration and amplitude by the action of the wave shape modifying means, the time interval between successive pulses varying in accordance with varying intervals between successive voltage peaks of the modulated carrier current; and recording means responsive to the pulse producing means for producing a series of impressions on the moving medium in response to successive impulses, the impressions being substantially uniform in all respects and spaced from each other along the medium in the direction of motion thereof in accordance with the varying intervals between successive impulses.

2. A device according to claim 1 in which the moving medium is a photographic film and the recording means comprises illuminating means for illuminating successive uniform areas of the film with uniform intensity of illumination, the spacing between successive areas varying in accordance with the varying intervals between successive impulses.

3. In a system for recording sound on a moving photographic medium, in combination; a source of electrical oscillations, means for converting the sound to be recorded into an audio frequency voltage, modulating means for shifting the instantaneous phase angle of the source of oscillations in accordance with the audio frequency voltage, pulse producing means to produce a series of pulses of substantially equal width variably spaced apart in accordance with the peaks of the phase modulated oscillations, cathode ray tube means having a screen, said tube means being responsive to each said pulse to produce a separate substantially straight luminous line on said screen, means for projecting each said luminous line on said moving photographic medium transversely to the movement of the medium to produce a photographic record thereupon consisting of a series of transverse lines of substantially equal photographic contrast and of spacing longitudinally in the direction of motion of the photographic medium varying in accordance only with the spacing of the peaks of the phase modulated oscillations.

4. In a system according to claim 3, the combination in which said means for projecting each said luminous line includes means for limiting said lines to a substantially equal length.

5. In a system for recording an audio frequency electrical voltage on a moving photographic medium, in combination; a source of electrical oscillations, a source of audio frequency voltages, modulating means for shifting the instantaneous phase angle of the source of oscillations in accordance with the audio frequency voltage, pulse producing means to produce a series of pulses of substantially equal width variably spaced apart in accordance with the peaks of the phase modulated oscillations, cathode ray tube means having a screen, said tube being responsive to each said pulse to produce a separate substantially straight luminous line on said screen, means for projecting each said luminous line on the moving photographic medium transversely to the movement of the medium to produce a photographic record thereupon consisting of a series of transverse lines of substantially equal photographic contrast and of spacing longitudinally in the direction of motion of the photographic medium, the spacing varying in accordance with the spacing of the peaks of the phase modulated oscillations.

6. In a system according to claim 5, the combination in which said means for projecting each said luminous line includes means for limiting said lines to a substantially equal length.

MALBON H. JENNINGS.

REFERENCES CITED

The following references are of record in the file of this patent:

UNITED STATES PATENTS

| Number | Name | Date |
|---|---|---|
| 1,482,119 | De Forest | Jan. 29, 1924 |
| 1,862,327 | Bagno | June 7, 1932 |
| 2,025,374 | Bostwick | Dec. 24, 1935 |
| 2,294,015 | Salb | Aug. 25, 1942 |
| 2,304,633 | Farnsworth | Dec. 8, 1942 |
| 2,315,097 | Schlegal | Mar. 30, 1943 |
| 2,349,886 | Roberts | May 30, 1944 |
| 2,392,546 | Peterson | Jan. 8, 1946 |
| 2,405,876 | Crosby | Aug. 13, 1946 |
| 2,416,286 | Busignes | Feb. 25, 1947 |
| 2,424,274 | Hansell | July 22, 1947 |

FOREIGN PATENTS

| Number | Country | Date |
|---|---|---|
| 719,022 | France | Feb. 1, 1932 |